US011263252B2

(12) United States Patent
Wang et al.

(10) Patent No.: US 11,263,252 B2
(45) Date of Patent: Mar. 1, 2022

(54) SUPPORTING FILE SYSTEM CLONES IN ANY ORDERED KEY-VALUE STORE USING INODE BACK POINTERS

(71) Applicant: VMware, Inc., Palo Alto, CA (US)

(72) Inventors: Wenguang Wang, Santa Clara, CA (US); Richard P. Spillane, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 488 days.

(21) Appl. No.: 15/627,898

(22) Filed: Jun. 20, 2017

(65) Prior Publication Data

US 2018/0365236 A1    Dec. 20, 2018

(51) Int. Cl.
| | |
|---|---|
| *G06F 16/14* | (2019.01) |
| *G06F 3/06* | (2006.01) |
| *G06F 11/14* | (2006.01) |
| *G06F 16/188* | (2019.01) |
| *G06F 11/07* | (2006.01) |
| *G06F 9/455* | (2018.01) |
| *G06F 16/41* | (2019.01) |

(52) U.S. Cl.
CPC ............ *G06F 16/41* (2019.01); *G06F 3/0665* (2013.01); *G06F 11/1469* (2013.01); *G06F 16/188* (2019.01); *G06F 9/45558* (2013.01); *G06F 11/0718* (2013.01); *G06F 2009/45562* (2013.01)

(58) Field of Classification Search
CPC ...... G06F 16/41; G06F 16/188; G06F 3/0665; G06F 11/1469; G06F 9/45558; G06F 11/0718; G06F 2009/45562
See application file for complete search history.

(56) References Cited

U.S. PATENT DOCUMENTS

| | | | | |
|---|---|---|---|---|
| 6,055,515 | A * | 4/2000 | Consentino | G06F 3/0481 |
| | | | | 705/27.1 |
| 7,197,516 | B1 * | 3/2007 | Hipp | G06F 16/10 |
| 7,996,636 | B1 * | 8/2011 | Prakash | G06F 3/0619 |
| | | | | 711/162 |
| 8,032,491 | B1 | 10/2011 | Appellof et al. | |
| 8,190,835 | B1 * | 5/2012 | Yueh | G06F 3/0608 |
| | | | | 711/162 |
| 8,423,733 | B1 * | 4/2013 | Ozdemir | G06F 3/0604 |
| | | | | 711/162 |
| 9,037,544 | B1 * | 5/2015 | Zheng | G06F 3/067 |
| | | | | 707/639 |

(Continued)

*Primary Examiner* — Alford W Kindred
*Assistant Examiner* — Lin Lin M Htay
(74) *Attorney, Agent, or Firm* — Patterson + Sheridan, LLP

(57) ABSTRACT

Embodiments described herein are related to cloning a volume in a file system. In some embodiments, for each index node representing a file or directory in the volume, the index node is updated to include a back pointer to each file or directory which points to the index node in the volume. In some embodiments, a copy-on-write operation is performed in order to generate a clone of the volume's root node. In certain embodiments, upon determining that a file or directory of the clone has been modified, a new index node is generated representing the file or directory by copying an index node representing a corresponding file or directory of the volume. In some embodiments, each file or directory which should point to the new index node in the clone is identified based on one or more back pointers and updated to point to the new index node.

21 Claims, 5 Drawing Sheets

(56) References Cited

U.S. PATENT DOCUMENTS

| | | | |
|---|---|---|---|
| 2010/0223320 A1* | 9/2010 | Huang | H04L 67/14 |
| | | | 709/203 |
| 2012/0023082 A1* | 1/2012 | Kotha | G06F 16/2246 |
| | | | 707/706 |
| 2014/0281360 A1* | 9/2014 | Danilak | G06F 16/2272 |
| | | | 711/206 |
| 2016/0216909 A1* | 7/2016 | Provenzano | G06F 3/0604 |
| 2017/0351697 A1* | 12/2017 | Brosch | G06F 3/0683 |
| 2018/0364950 A1 | 12/2018 | Spillane et al. | |

* cited by examiner

SUPPORTING FILE SYSTEM CLONES IN ANY ORDERED KEY-VALUE STORE USING INODE BACK POINTERS

BACKGROUND

Data stored in a storage device is often accessible using a block device interface. The data is typically visible and accessible to any client with access to the storage device. Operating systems or other storage clients can erase data from the storage device, format the storage device, and otherwise manipulate and change the data.

File systems typically organize data as files in a hierarchy of directories, and an index node (inode) is assigned to each of the files and to each of the directories. A file inode includes references to data blocks of user data. A directory inode includes references to data blocks that contain filenames, which may correspond to either a directory or a file, and inode numbers corresponding to the filenames.

Some B-tree-based file systems, such as Btrfs™, provide a volume clone operation that atomically creates a copy-on-write snapshot of a volume which is a hierarchy of directories and files. By cloning, the file system does not create a copy of all metadata and/or data of the volume, but uses the native efficient clone feature of the key-value store which stores all file system metadata. That is, such B-tree-based file systems can clone a volume by creating another efficient copy of the B-tree using copy-on-write (COW) B-tree. However, this approach is not available in all file systems, as there are only certain types of key-value stores backing file systems (e.g., copy-on-write B-Trees) which support the clone operation. Furthermore, merely using directory hard links (e.g., creating a clone of a file system which initially contains a hard link to the inode of the root directory of the file system) to perform a copy-on-write clone can lead to problems in certain cases.

One case in which the use of directory hard links to perform a copy-on-write clone of a file system causes problems is when a first and second file in the file system both contain hard links to the same inode. As discussed above, a hard link is a direct link to an existing inode (whereas the connection between a file or directory and a newly created inode is generally referred to as a soft link or simply a link). Because copy-on-write means that a new inode will not be created until a change is made, the copies of the first and second files in the clone of the file system will contain hard links to the original inode. If a change is made to the copy of the first file, a new inode will be generated and the hard link of the copy of the first file will be updated to point to the new inode, but the copy of the second file will still contain a hard link to the original inode. Accordingly, the copy of the second file will not point to the correct data within the clone of the file system. As such, there is a need for a reliable method of performing a copy-on-write clone in any type of file system without requiring native clone function of key-value stores.

DETAILED DESCRIPTION

Figure 1:
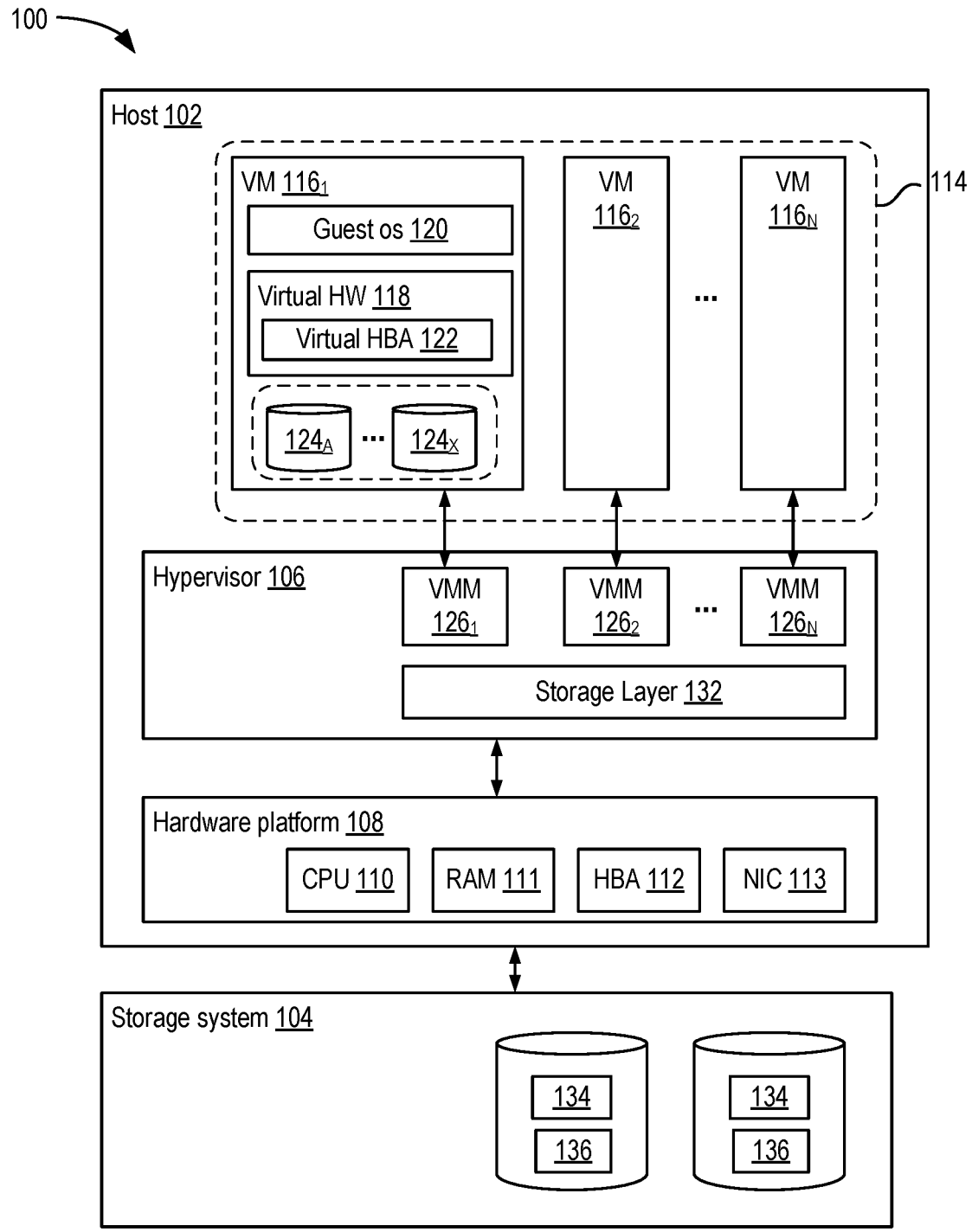
FIG. 1 is a block diagram that illustrates a computer system in which one or more embodiments may be utilized.

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106, that enables sharing of the hardware resources of host 102 by VMs 116. One example of hypervisor 106 is a VMware ESXi hypervisor provided as part of the VMware vSphere solution made commercially available from VMware, Inc. In some embodiments, storage system 104 may be implemented as software-defined storage such as VMware Virtual SAN that clusters together server-attached hard disks and/or solid state drives (HDDs and/or SSDs), to create a flash-optimized, highly resilient shared datastore designed for virtual environments.

Host 102 may comprise a general purpose computer system having one or more virtual machines accessing data stored on a storage system 104 communicatively connected to host 102. Host 102 may be constructed on a conventional, typically server-class, hardware platform 108. Hardware platform 108 of host 102 may include conventional physical components of a computing device, such as a processor (CPU) 110, a memory 111, a disk interface 112, and a network interface card (NIC) 113. Processor 110 is configured to execute instructions, for example, executable instructions that perform one or more operations described herein and may be stored in memory 111. Memory 111 and storage system 104 are devices allowing information, such as executable instructions, cryptographic keys, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC).

While storage system 104 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state disks, or "SSDs." In some embodiments, storage system 104 may be comprised of high-density non-volatile memory. Furthermore, while storage system 104 is depicted as a separate, external component to host 102, storage system 104 may be internal to host 102, for example, a local storage device or locally attached storage.

As shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks $124_A$-$124_X$) to enable execution of guest OS 120 transparent to the virtualization of the system hardware. A virtual disk 124 exposes the same abstraction as a real (physical) disk, that is, a linear list of sectors; however, a virtual machine monitor (VMM) may choose to implement virtual disks 124 as regular files on the host. Although, from the perspective of guest operating systems 120, file system calls initiated by such guest operating systems 120 to implement file system-related data transfer and control operations appear to be routed to virtual disks $124_A$-$124_X$ for final execution, in reality, such calls are processed and passed through virtual HBA 122 to adjunct VMM layers $126_1$-$126_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104.

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation (in the form of I/O commands, for example, intended for a virtual disk) from VMM layers $126_1$ to $126_N$, and converts the operations into file system operations that are understood by a virtual machine file system (VMFS) driver in order to access a file stored in underlying storage under the management of the VMFS driver that represents virtual disk 124. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage system 104. The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

Storage layer 132 maintains on-disk storage metadata 134 for facilitating the dynamic allocation of storage blocks 136 (sometimes referred to as disk blocks, disk sectors, or sectors) and other operations on storage system 104. For example, storage layer 132 is configured to receive and/or execute space allocation requests for storage blocks 136 that can used to handle requests to write data to storage system 104. In some embodiments, storage layer 132 uses storage metadata 134 for such tasks as remembering which storage blocks 136 are allocated and which storage blocks are free (e.g., bitmaps), or allowing quick random access to an arbitrary block in a particular file (e.g., key-value stores such as B-trees, Log-structured Merging (LSM) trees, rocksdb, and the like).

Figure 2:
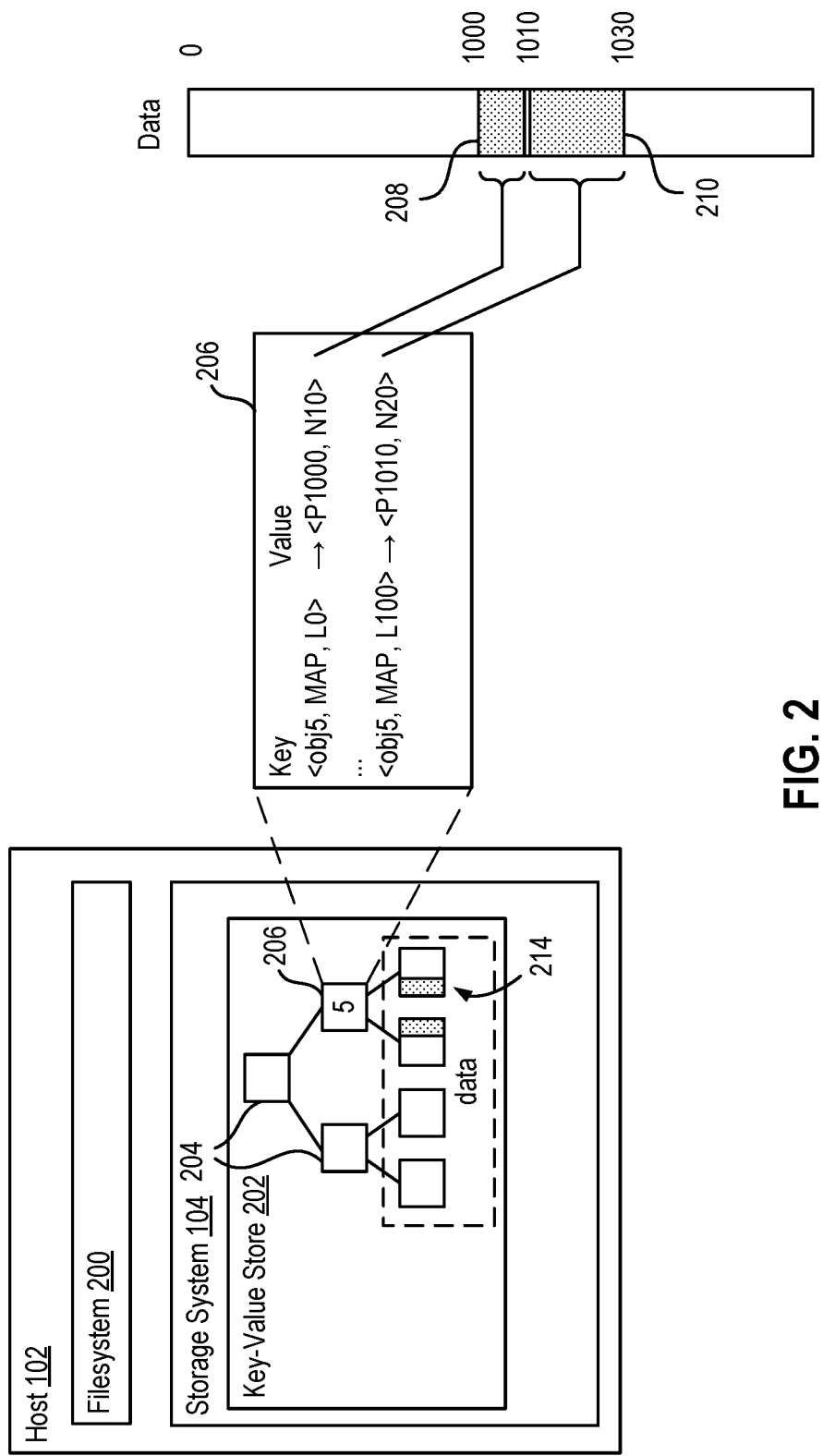
FIG. 2 is a block diagram depicting a file system maintaining data structures for processing file operations, according to one embodiment of the present disclosure.

FIG. 2 is a block diagram depicting a file system 200 maintaining data structures for processing file operations, according to one embodiment of the present disclosure. A host 102 includes a file system 200 that controls how data within storage system 104 is stored and retrieved. File system 200 may be storage layer 132 described in conjunction with FIG. 1, or in other embodiments, may be any file system or storage subsystem.

In one embodiment, file system 200 maintains one or more key-value stores 202 within storage system 104 to manage the file system's metadata and features. Key-value store 202 may comprise any type of data structure, including B-trees, B+ trees, Copy-on-write B+ trees (i.e., B+ trees which maintain node reference counts and do not have leaf chaining), LSM Trees, B-ε trees, rocksdb, and other tree-like data structures.

In one embodiment, key-value store 202 may be comprised of a plurality of nodes 204, which can represent files or directories or portions of files or directories. Each node 204 contains entries (sometimes referred to as items) that can represent extents of a file, entries that represent directory contents and structure, and entries containing other file system-related metadata. Each node 204 is associated with and may be indexed by an inode number. In the example shown in FIG. 2, a node 206 within key-value store 202 is associated with an inode number "5".

In one embodiment, each entry within a node 204 may be represented as a key-value pair. The key of an entry may include the inode number associated with the entry, such that all entries (including entries in other nodes 204) can be logically grouped together in key-value store 202. The key of an entry includes a type field storing a value or code indicating the type of information, e.g., basic inode entry information (e.g., INODE_ITEM) or directory information (e.g., DIR_ITEM). The key of an entry may further include other parameters, such as an offset field that indicates the byte offset for a particular entry in the node. For example, in case of a file extent, the offset field indicates the logical byte offset from the start value of the extent of the file. In one embodiment, the value portion of an entry includes a physical block number field indicating the physical address or offset of the extent within disk and a size field indicating a number of data blocks occupied by the extent. In one or more embodiments, each entry within a node 204 may be represented by the following key-value format:

<inode, type, logical_blkoff>=<physical_blknum, num_of_blocks>

Example entries of a node (e.g., node 206) are depicted in FIG. 2. Node 206 represents a file and has been assigned an inode number 5 (depicted as an object ID "obj5"). Leaf nodes 214 points to the data of the file. Node 206 includes a first entry (i.e., "<obj5, MAP, L0>→><P1000, N10>") representing a first extent 208 of data for the file starting at logical block address 0 ("L0") found at the physical block address 1000 ("P1000") and extending for 10 blocks ("N10") to P1010. Node 206 includes a second entry (i.e., "<obj5, MAP, L100>→><P1010, N20>") representing a second extent 210 of data for the file starting at logical block address 100 ("L100") and extending for 20 blocks ("N20") to P1030. Both depicted entries specify a type value ("MAP") indicating the entries map to file extent data. Node 206 may include other, additional entries, which have been omitted for clarity of illustration. The formats and values depicted in FIG. 2 are an example and other formats or designated values may be used instead.

File system 200 may support logical volumes. When a file system uses logical volumes, the file system no longer controls physical placement of inodes on data storage units. The file system only controls inode layout in the logical volume address space. The mapping of inodes in the logical volume address space to data storage units is done outside the file system's control by a logical volume manager such as based on availability. Consequently, inodes may be scattered over data storage units with different inodes residing in different data storage units. As one example, a file represented by the path "/root/dir1/dir2/example.doc" may have inodes for the directories (directory inodes) and the file (file inode) residing in different data storage units.

Thus, in a file system that employs logical volumes, availability of the namespace and file objects referenced by paths is contingent on availability of all the data storage units that comprise a logical volume. If one or more of the data storage units comprising a logical volume go offline, a file may not be accessible by the file system, because the inode corresponding to one or more of the file's path components, e.g., /dir1 or /dir2, may not be available.

The logical volume enables useful enterprise features such as the ability to hot-replace data storage units without changing the file system address space, hot-extend logical volume length by adding new data storage units, provide software redundant array of inexpensive disks (RAID) availability features, implement data mirroring and replication over multiple data storage units, and the like.

Embodiments of the present disclosure provide techniques for supporting a clone of a logical volume in any ordered key-value store, such as key-value store 202. A file system clone may be performed by file system 200, and may involve using copy-on-write to clone a logical volume indexed by key-value store 202. A "super root" directory entry is first inserted (e.g., at the time the logical volume is initially formatted) in the file system schema above the logical volume to be cloned, such that the super root directory is the parent of the volume. This allows for the creation of a clone of a volume which shares the same parent directory (the super root) as the volume.

Figure 3:
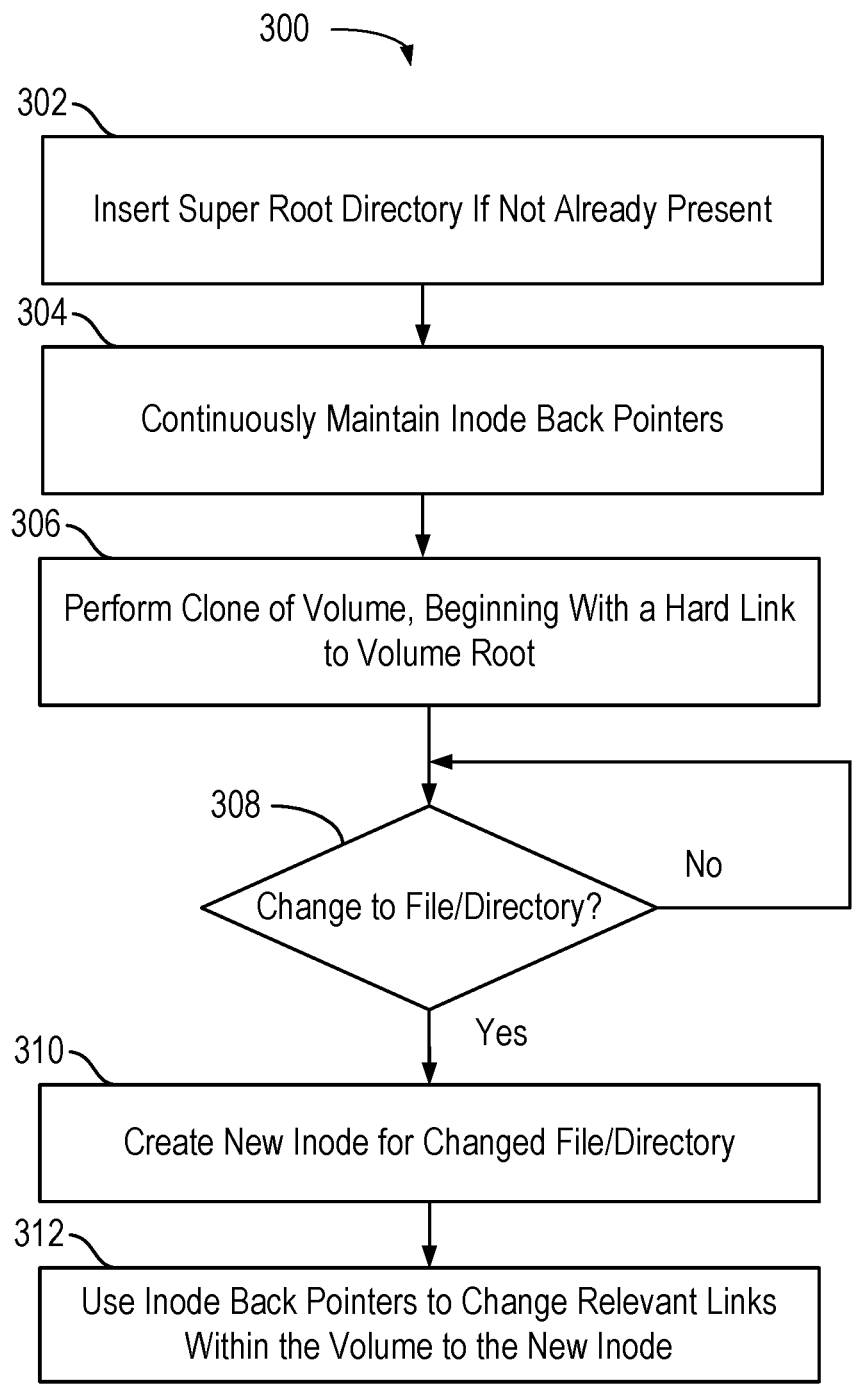
FIG. 3 is a flow diagram illustrating a method for performing a clone of a logical volume and updating the logical volume or the clone using copy-on-write in an ordered key-value store, according to embodiments of the present disclosure.

FIG. 3 is a flow diagram illustrating a method 300 for performing a clone of a logical volume and updating the logical volume or the clone using copy-on-write in an ordered key-value store such as key-value store 202. While method 300 is described in conjunction with the systems shown in FIGS. 1 and 2, it should be recognized that other systems may be used to perform the described methods. By way of example, method 300 may further be explained in conjunction with FIGS. 4A to 4D, which depict the logical structure of an example file system as operations are performed.

Method 300 begins at step 302, where file system 200 inserts a super root directory above all other directories and files in the logical schema of the file system if a super root directory is not already present. In some embodiments, this step takes place when the original logical volume is initially formatted, while in alternative embodiments it is performed at some other point prior to initiating a clone of the original logical volume. For example, a directory labeled "/" may be added to the logical schema of the file system such that the directory which previously constituted the root of the original logical volume now has the "/" directory as its parent or "super root". This allows for a clone of the logical volume to be created which shares the same parent (the super root) as the original logical volume.

At step 304, for each inode which represents a directory or file in the original logical volume, file system 200 maintains back pointers within the inode pointing to each directory and file which contains a link to the inode. Step 304 may, for example, be performed on an ongoing basis, such that a back pointer is added by file system 200 to an inode every time a link to the inode is added from a directory or file. A link to the inode may be added from a directory or file, for instance, when a user of host 102 first creates a new file or directory, resulting in the creation of the inode to which the file or directory points. A link to the inode may also be added if a hard link is created to an existing file or directory corresponding to the inode. For example, if two different directories are added (e.g., by a user of host 102) which contain a link to the same inode (e.g., the same file is located within two different directories in the logical schema), then back pointers to both directories will be added by file system 200 to the inode. This allows file system 200 to determine all locations in the logical schema which point to a particular inode.

At step 306, file system 200 performs a copy-on-write clone of the logical volume. For example, a clone of the root directory of the logical volume may be created as a child of the super root directory, and the clone of the root directory may contain "copy-on-write hard links" to the inodes of any files or directories which comprise the contents of the root directory of the original logical volume. A copy-on-write hard link is a specific type of hard link that is only used in this solution when a volume is cloned, and is different than the type of hard link created by the "link( )" system call. The link( ) system call is updated by file system 200 such that it cannot be used to create a hard link between two different volumes (e.g., two different directories beneath the super-root node). For example, every time a hard link is created using link( ), file system 200 checks the path names and only allows the hard link to be created if it is between two files or directories within the same volume. Thus, a special copy-on-write hard link is used during the clone operation described in the present disclosure so that hard links can be created between volumes. The clone of the logical volume constitutes a separate logical volume which includes all of the contents of the original logical volume. A new inode is created for the clone of the root directory which initially points to the same files and directories as the original logical volume (using copy-on-write hard links), but new inodes will not be created for the rest of the directories and files within the clone of the logical volume until changes are written to the directories and files (e.g., the inode of a directory or file is copied to a new inode when a change is written to that directory or file either in the clone or in the original logical volume). All of the files and directories in the original logical volume still link to their original inodes after the initial copy-on-write is performed. Copy-on-write provides performance benefits, as it delays copy operations until necessary to differentiate between the original and the clone of a file or directory (e.g., when a change has been made to either the original or the clone).

At step 308, file system 200 determines if there has been a change to a file or directory within either the original logical volume or the clone. As long as no file or directory is changed, operations remain at step 308. When a change to a file or directory is determined (e.g., a file is modified), operations continue at step 310.

At step 310, file system 200 copies the changed file or directory for the one of the original logical volume or the clone, creating a new inode for the file or directory for the one of the original logical volume or the clone. For example, if a file within the clone is modified, file system 200 makes a copy of the file, creating a new inode to which the copy of the file points for the clone, where both the new and old inode points to the same file data to avoid unnecessary file data copy. If the modified file is located beneath other directories, the other directories are also copied, and new inodes are generated for the copies of the directories. For example, if the file "/clone/directory/file.txt" is modified, new copies of both "directory" and "file.txt" will be added beneath "clone", which is the root of the clone of the logical volume, and new inodes will be generated for each.

At step 312, file system 200 uses the back pointers of the inode copied at step 310 to determine all files and directories which point to the inode, and then modifies all such files and directories within the logical volume to point to the new inode. For example, if the same file with the same inode is included under two different directories within the logical volume, both directories will be modified to point to the new inode for the file. If additional directories are also copied at step 310 (e.g., if a modified file is beneath another directory which is also copied with a new inode), then step 312 will also be performed for the new inodes of these directories. Using the back pointers to update all relevant links within the logical volume to point to the new inode allows for the copy-on-write clone to be performed without inconsistency being introduced within the clone of the logical volume (e.g., the inconsistency which results when two different directories in the logical volume point to the same file and only one of the directories is modified to point to an updated version of the file). The benefits of this approach will be demonstrated in more detail with respect to FIGS. 4A to 4D below.

When a new inode is generated for a copy of a file or directory, the new inode will include a new inode number. In some embodiments, the old inode number (e.g., the inode number of the file or directory which is copied) will be saved within the new inode as an "external inode number". This allows for continuity to be maintained in the event that an outside entity requests the inode number (e.g., using a "stat( )" call in Unix) both before the file or directory is changed and after the new inode is generated in response to the change. The external inode number is always provided in response to an outside request for an inode number so that consistency is maintained. The new inode number will be used within file system 200, however, as it differentiates between the original inode and the copy.

FIGS. 4A to 4D depict the logical schema of a file system, such as file system 200, as various operations associated with a copy-on-write clone are performed. Each logical item depicted (e.g., super root 402, file 412, and the like) represents a directory or file within the file system, and may, for example, comprise a node (e.g., node 204) within key-value store 202. Each logical item, such as file 412, is associated with an inode number.

Figure 4A:
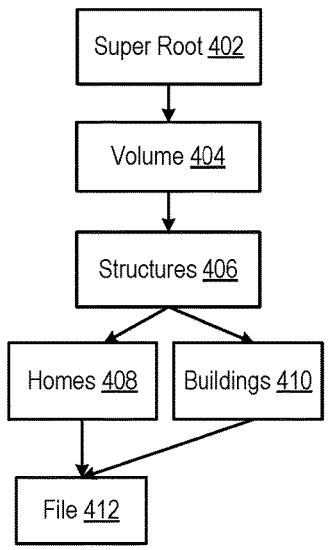
FIGS. 4A to 4D depict the logical schema of a file system as various operations associated with a copy-on-write clone are performed, according to embodiments of the present disclosure.

FIG. 4A shows a super root 402 inserted above a volume 404 within a file system, such as file system 200. Super root 402 may, for example, comprise a directory labeled "/", which is added (e.g., when volume 404 is initially formatted) so that a clone of volume 404 may be created beneath the super root within the same file system. As shown, volume 404 is the root directory of the volume, which contains a directory called structures 406. Under the structures 406 directory are two directories called homes 408 and buildings 410. Under homes 408 is a file 412. Buildings 410 also contains a link to the same file 412 which is under homes 408. For example, the same file 412 may be included under two different directories (homes 408 and buildings 410), and both may point to the same inode.

Each inode within the file system (e.g., the inodes associated with super root 402, volume 404, structures 406, homes 408, buildings 410, and file 412) contains back pointers to any files or directories which point to the inode. For example, the inode of file 412 contains back pointers to both homes 408 and buildings 410, indicating that both "structures/homes/file" and "structures/buildings/file" within volume 404 point to this same inode. The back pointers may be added, for example, by file system 200 on an ongoing basis as files and directories are added beneath volume 404.

Figure 4B:
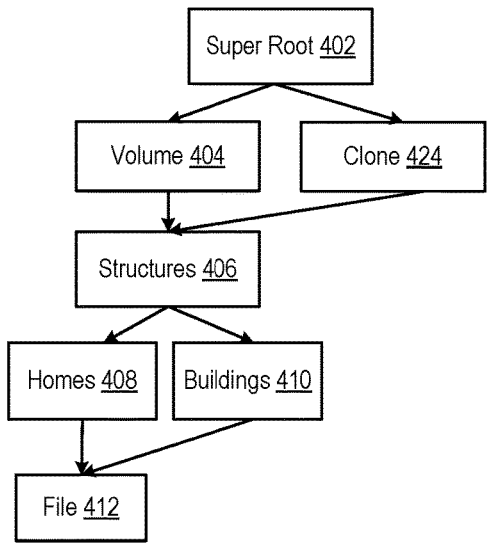

In FIG. 4B, a copy-on-write clone of volume 404 has been created. The root directory of volume 404 has been duplicated as another root directory called clone 424, which has been added beneath super root 402. Because copy-on-write is used, the entire volume has not been copied yet, but instead a link has been added from clone 424 to the contents of volume 404 (e.g., structures 406). Each of the other directories and files in the volume is to be copied later as changes are made to each. If an entity accesses "/clone/structures/homes/file" before it has been changed, the contents will be retrieved by following the link to "/volume/structures/homes/file". The inode of volume 404 is copied to a new inode for clone 424 when it is created. The new inode contains all of the contents of the original inode (in addition to any changes that have been made) with a new inode number. Every time an inode is copied to a new inode, the back pointers of the inode are also copied. Back pointers may, for example, refer to paths relative to the volume within which they are located. For example, the inode of file 412 may indicate that it is pointed to by both "/structures/homes/file" and "structures/buildings/file" within the volume 404.

Figure 4C:
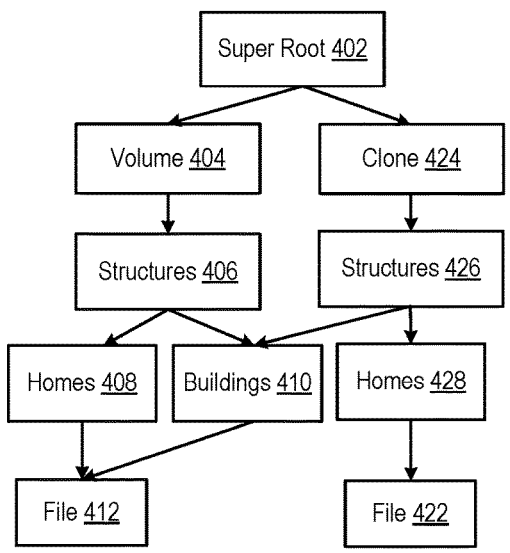

In FIG. 4C, a change has been made to "/clone/structures/homes/file", and so a copy-on-write is performed, resulting in the generation of an inode for file 422, which is a copy of the inode for file 412. Because the file is located under the directories "structures" and "homes", these directories are copied at this point as well, resulting in the generation of structures 426 and homes 428 under clone 424. Because the change has been made to "/clone/structures/homes/file", and not to "/volume/structures/homes/file", new inodes (e.g., copies of the original inodes which reflect the change and include new inode numbers) are generated for structures 426, homes 428, and file 422, so that the change will only be reflected within the clone.

At this point, a problem has been introduced. As can be seen clearly in FIG. 4A, "structures/buildings/file" should point to the same file as "structures/homes/file" (e.g., both homes 408 and buildings 408 point to the same file 412). However, in FIG. 4C, within the clone 424, "structures/homes/file" points to the updated file 422, while "structure/buildings/file" still points to the original file 412. This is because the change to "structures/homes/file" has only resulted in a copy-on-write being performed on that particular path. In order to resolve this inconsistency, the back pointers stored in the inode of file 422 (copied from the inode of file 412) are used to determine all files and directories which point to the inode, and then modify all such files and directories within the logical volume (in this case, clone 424) to point to the new inode (in this case, the inode of the updated file 422). In the example shown, the back pointers of the inode of file 422 will indicate that both "structures/homes/file" and "structures/buildings/file" point to the inode. Therefore, when "structures/homes/file" is modified, the back pointers will be used to determine that "structures/buildings/file" also points to the same inode, and so this path will also be modified to point to the new inode, as shown in FIG. 4D.

Figure 4D:
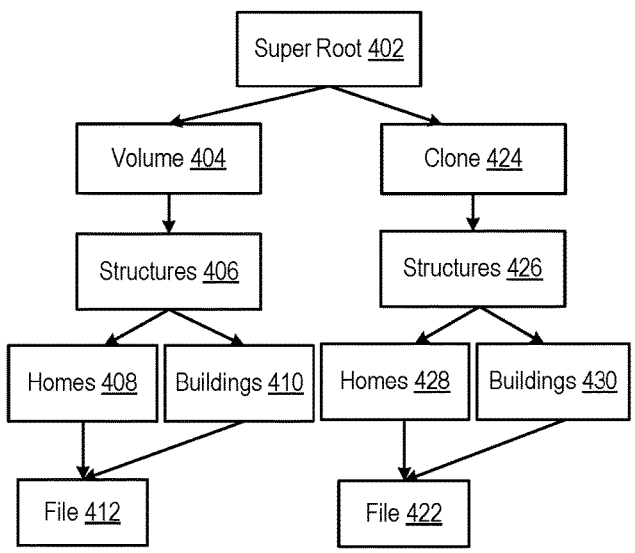

In FIG. 4D, the back pointers have been used to modify all relevant links within clone 424 to point to the inode of the updated file 422. As shown, "structures/buildings/file" under clone 424 now points to the same file 422 as "structures/homes/file". Buildings 430 may be generated, for example, by copying the inode of buildings 410 and generating a new inode number for buildings 430, and then creating a link to the inode of file 422 under buildings 430. As a result of these operations, the integrity of the file system is restored, and all directories and files within clone 424 point to the most updated information for this volume.

Each time an inode is copied to a new inode, a new inode number is generated for the copy. The old inode number is stored within the new inode as an "external inode number" to be provided to requesting outside entities (e.g., in response to a stat( ) command). This ensures that the same inode number is always returned for a particular file or directory within the volume, both before and after the file or directory is modified and copied.

Figure 5:
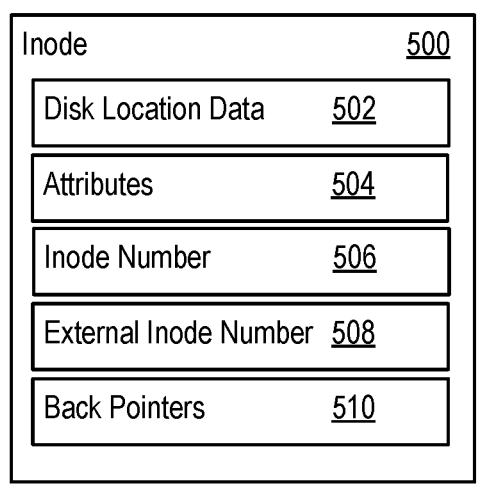
FIG. 5 is an illustration of an inode according to certain embodiments of the present disclosure.

FIG. 5 is an illustration of an inode 500 according to certain embodiments of the present disclosure. As shown, inode 500 includes disk location data 502, attributes 504, an inode number 506, an external inode number 508, and back pointers 510. Inode 500 may be stored within a data storage unit (e.g., storage system 104 in FIG. 1) which is accessible by file system 200, and may represent a file or directory within the logical schema of file system 200. File system 200 may map inodes 500 to filenames within key-value store 202 in order to define the logical schema of file system 200.

Disk location data 502 comprises the physical disk location(s) at which the data for the object represented by inode 500 is stored. For example, if inode 500 represents a file, disk location data 502 will identify the disk blocks at which the data for the file is located, indicating the physical address or offset of the extent of the file within disk and a size field indicating a number of data blocks occupied by the extent.

Attributes 504 comprise metadata about the object represented by inode 500. For example, if inode 500 represents a file, attributes 504 may include such information as file ownership, access mode (read, write, execute permissions for various users), file type, file size, and the like. Attributes 504 may be retrieved using a stat( ) call in Unix systems.

Inode number 506 comprises the number by which inode 500 is indexed. For example, file system 200 may use inode number 506 to map a filename to inode 500 within the file system's logical schema.

External inode number 508 comprises an inode number which is provided to external requesters, and may be different than inode number 506. According to embodiments of the present disclosure, when an inode is copied as part of a copy-on-write clone, the new copy of the inode will have a new inode number 506, but the old inode number will be saved as external inode number 508. This allows for continuity to be maintained within a volume, so that if an external requester retrieves the inode number (e.g., using a stat( ) call) both before and after the copy operation, the same number will be returned in both cases.

Back pointers 510 comprise pointers to each file or directory which points to inode 500. For example, if a file represented by an inode is listed under two different directories within the logical schema of file system 200, the inode for the file will contain back pointers to both directories. This allows for all relevant links to be updated when the inode is changed (e.g., when the inode is copied to a new inode), so that all links will point to the correct inode within the volume. In some embodiments, back pointers 510 are defined relative to the volume. Back pointers 510 may, for example, be added to all inodes 500 within a volume by file system 200 prior to performing a copy-on-write clone of the volume.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for cloning a volume in a file system, comprising:
    for each index node representing a file or directory in the volume, updating the index node to include a back pointer to each file or directory which points to the index node in the volume;
    prior to performing a copy-on-write operation in order to generate a clone of a root node of the volume:
        determining if a super root node was added, in a previous volume clone or format operation, above the root node of the volume in a logical schema of the file system; and
        adding the super root node above the root node of the volume in the logical schema of the file system if it was not added in a previous volume clone or format operation, wherein the clone of the root node of the volume is generated below the super root node;
    performing the copy-on-write operation in order to generate the clone of the root node of the volume by generating a first new index node for the clone of the root node of the volume, wherein the clone of the root node of the volume contains one or more files or directories which comprise hard links to index nodes of corresponding files or directories of the volume; and
    upon determining that a file or directory of the clone has been modified:
        generating a second new index node representing the file or directory by copying an index node representing a corresponding file or directory of the volume;
        identifying, based on one or more back pointers included in the second new index node, each file or directory which should point to the second new index node in the clone; and
        updating each identified file or directory to point to the second new index node.

2. The method of claim 1, wherein each index node comprises an index node number, and wherein generating the second new index node further comprises:
    generating a new index node number to replace an existing index node number of the second new index node, wherein the existing index node number comprises the index node number of the index node representing the corresponding file or directory of the volume.

3. The method of claim 2, wherein the existing index node number is stored as an external index node number of the second new index node.

4. The method of claim 3, wherein the external index node number is provided in response to requests by entities outside of the file system for the index node number of the second new index node.

5. The method of claim 1, wherein the file system comprises a key-value store.

6. The method of claim 1, wherein each index node comprises one or more physical addresses of data blocks for the file or directory.

7. The method of claim 1, wherein each file and directory in the file system comprises a name which is mapped to an index node.

8. A non-transitory computer-readable storage medium comprising instructions that, when executed in a computing device, perform a method for cloning a volume in a file system, the method comprising:
 for each index node representing a file or directory in the volume, updating the index node to include a back pointer to each file or directory which points to the index node in the volume;
 prior to performing a copy-on-write operation in order to generate a clone of a root node of the volume:
  determining if a super root node was added, in a previous volume clone or format operation, above the root node of the volume in a logical schema of the file system; and
  adding the super root node above the root node of the volume in the logical schema of the file system if it was not added in a previous volume clone or format operation, wherein the clone of the root node of the volume is generated below the super root node;
 performing the copy-on-write operation in order to generate the clone of the root node of the volume by generating a first new index node for the clone of the root node of the volume, wherein the clone of the root node of the volume contains one or more files or directories which comprise hard links to index nodes of corresponding files or directories of the volume; and
 upon determining that a file or directory of the clone has been modified:
  generating a second new index node representing the file or directory by copying an index node representing a corresponding file or directory of the volume;
  identifying, based on one or more back pointers included in the second new index node, each file or directory which should point to the second new index node in the clone; and
  updating each identified file or directory to point to the second new index node.

9. The non-transitory computer-readable storage medium of claim 8, wherein each index node comprises an index node number, and wherein generating the second new index node further comprises:
 generating a new index node number to replace an existing index node number of the second new index node, wherein the existing index node number comprises the index node number of the index node representing the corresponding file or directory of the volume.

10. The non-transitory computer-readable storage medium of claim 9, wherein the existing index node number is stored as an external index node number of the second new index node.

11. The non-transitory computer-readable storage medium of claim 10, wherein the external index node number is provided in response to requests by entities outside of the file system for the index node number of the second new index node.

12. The non-transitory computer-readable storage medium of claim 8, wherein the file system comprises a key-value store.

13. The non-transitory computer-readable storage medium of claim 8, wherein each index node comprises one or more physical addresses of data blocks for the file or directory.

14. The non-transitory computer-readable storage medium of claim 8, wherein each file and directory in the file system comprises a name which is mapped to an index node.

15. A computer system for allocating storage space, the computer system comprising:
 a storage device comprising a file system;
 a processor (CPU) configured to perform a method for cloning a volume in a file system, the method comprising:
  for each index node representing a file or directory in the volume, updating the index node to include a back pointer to each file or directory which points to the index node in the volume;
  prior to performing a copy-on-write operation in order to generate a clone of a root node of the volume:
   determining if a super root node was added, in a previous volume clone or format operation, above the root node of the volume in a logical schema of the file system; and
   adding the super root node above the root node of the volume in the logical schema of the file system if it was not added in a previous volume clone or format operation, wherein the clone of the root node of the volume is generated below the super root node;
  performing the copy-on-write operation in order to generate the clone of the root node of the volume by generating a first new index node for the clone of the root node of the volume, wherein the clone of the root node of the volume contains one or more files or directories which comprise hard links to index nodes of corresponding files or directories of the volume; and
  upon determining that a file or directory of the clone has been modified:
   generating a second new index node representing the file or directory by copying an index node representing a corresponding file or directory of the volume;
   identifying, based on one or more back pointers included in the second new index node, each file or directory which should point to the second new index node in the clone; and
   updating each identified file or directory to point to the second new index node.

16. The computer system of claim 15, wherein each index node comprises an index node number, and wherein generating the second new index node further comprises:
 generating a new index node number to replace an existing index node number of the second new index node, wherein the existing index node number comprises the index node number of the index node representing the corresponding file or directory of the volume.

17. The computer system of claim 16, wherein the existing index node number is stored as an external index node number of the second new index node.

18. The computer system of claim 17, wherein the external index node number is provided in response to requests by entities outside of the file system for the index node number of the second new index node.

19. The computer system of claim 15, wherein the file system comprises a key-value store.

20. The computer system of claim 15, wherein each index node comprises one or more physical addresses of data blocks for the file or directory.

21. The computer system of claim 15, wherein each file and directory in the file system comprises a name which is mapped to an index node.

* * * * *